US011875307B2

(12) United States Patent
Cok et al.

(10) Patent No.: US 11,875,307 B2
(45) Date of Patent: Jan. 16, 2024

(54) IMAGE COLLECTION ANNOTATION USING A MOBILE COMMUNICATOR (71) Applicant: KODAK ALARIS INC., Rochester, NY (US)

(72) Inventors: Ronald Steven Cok, Rochester, NY (US); Peter Karl Traeg, Rochester, NY (US)

(73) Assignee: KODAK ALARIS INC., Rochester, NY (US)

( * ) Notice: Subject to any disclaimer, the term of this patent is extended or adjusted under 35 U.S.C. 154(b) by 0 days.

(21) Appl. No.: 16/540,912

(22) Filed: Aug. 14, 2019

(65) Prior Publication Data

US 2019/0370748 A1 Dec. 5, 2019

Related U.S. Application Data (63) Continuation of application No. 13/074,403, filed on Mar. 29, 2011, now abandoned.

(51) Int. Cl.
*G06Q 10/10* (2023.01)
*G06Q 50/00* (2012.01)
*G06F 16/58* (2019.01)

(52) U.S. Cl.
CPC ............ *G06Q 10/10* (2013.01); *G06F 16/58* (2019.01); *G06Q 50/01* (2013.01)

(58) Field of Classification Search
CPC ......... G06F 16/58; G06Q 10/10; G06Q 50/01
USPC ....................................................... 707/805
See application file for complete search history.

(56) References Cited

U.S. PATENT DOCUMENTS

| 2004/0049345 | A1* | 3/2004 | McDonough | G06Q 10/10 702/12 |
| 2005/0289461 | A1* | 12/2005 | Amado | G06Q 10/10 715/255 |
| 2007/0220092 | A1* | 9/2007 | Heitzeberg | H04L 51/04 709/204 |
| 2009/0234707 | A1* | 9/2009 | Perez | G06Q 20/10 705/300 |
| 2010/0070573 | A1* | 3/2010 | Olson | G06Q 10/10 709/203 |

OTHER PUBLICATIONS

Sandhaus P, Rabbath M, Boll S. Employing aesthetic principles for automatic photo book layout. InInternational Conference on Multimedia Modeling Jan. 5, 2011 (pp. 84-95). Springer, Berlin, Heidelberg. (Year: 2011).*

* cited by examiner

Primary Examiner — Mohsen Almani
(74) Attorney, Agent, or Firm — HOGAN LOVELLS US LLP (57) ABSTRACT Disclosed herein are embodiments directed to a multi-media image system, which includes using a processor for forming a multi-media image product. According to certain embodiments, the system stores an image collection on a digital storage system; associates an identifier with the image collection: provides the identifier for distribution to a plurality of individuals; receives images from the recipients of the identifier; and forming a multi-media image product using the images stored on the digital storage system and received from the recipients of the identifier.

13 Claims, 5 Drawing Sheets

FIG. 5

IMAGE COLLECTION ANNOTATION USING A MOBILE COMMUNICATOR

CROSS-REFERENCE TO RELATED APPLICATIONS

This application is a continuation of and claims priority to U.S. patent application Ser. No. 13/074,403, filed on Mar. 29, 2011, entitled "Image Collection Annotation Using a Mobile Communicator." That application is hereby incorporated by reference in its entirety.

FIELD OF THE INVENTION

This invention pertains to the field of digital imaging and more particularly to methods for a group of people to provide content and annotations useful for forming a multi-media image product.

BACKGROUND OF THE INVENTION

Digital images are widely used to commemorate events in people's lives. Such digital images are typically captured by digital cameras, stored temporarily in the digital cameras and then stored in electronic storage systems such as home computers. The availability of internet-accessible computers has also led to on-line digital image storage, for example with on-line data storage services, photo-merchandising services, social networking websites, and photo-sharing websites.

Digital cameras and other mobile communication devices are widely used. These devices are capable of capturing images and communicating captured images wirelessly through a network to a computer storage device. Such networks include local area computer networks and cellular telephony networks connected to computer networks. The computer networks are then typically connected to the internet. Most mobile communication devices provide audio telephony services and many also provide digital communication services such as text transmission or access to the internet through a processor executing software on the mobile communication device. As used herein, a mobile communication device includes portable devices that can interact remotely with other devices, typically through electromagnetic radiation such as cellular telephones, wireless computer networks, or optical readers or communicators.

On-line social network websites facilitated by the internet are popular for online digital image storage. On these websites, users can upload and store their digital images and provide access to the digital images to others in their social network, thereby sharing the digital images with the others. It is also known for others to record comments relevant to a digital image on the website.

Voice-recording and playback technology in computer systems is also well established. Audio can be input and digitized by computers, for example using a microphone with a USB connection and computer accessory hardware such as an analog-to-digital convertor. The digitized audio file can then be stored, for example as a file on a hard drive in a standard audio file format. Similarly, software programs that execute on a computer can read standard audio files and, with the use of a digital-to-analog convertor connected to a speaker, convert the digital audio file to sound. Voice messaging and telephone answering systems are also known and widely used.

However, such mobile communication devices, internet-mediated communication systems, and computer-based audio capabilities do not readily provide a means for simple and efficient group input in providing a collection of images related to an event and integrating comments with the collection for use by an individual.

SUMMARY OF THE INVENTION

The present invention sets forth a method for forming a multi-media image product, comprising:

using a processor to provide a storage location for a multi-media image collection in a digital storage system;

associating an identifier with the storage location, wherein the identifier is adapted to be transmitted from or with a mobile communication device; providing the identifier for distribution to a plurality of individuals;

receiving a plurality of multi-media content from two or more of the plurality of individuals, the multi-media content being transmitted from one or more mobile communication devices operated by the respective individuals employing the identifier, wherein the multi-media content includes one or more images, audio annotations, or text annotations captured by the mobile communication device;

storing the multi-media content in the storage location and associating the multi-media content with the multi-media collection; providing rules for associating the multi-media content with the images or the multi-media image collection; and making a multi-media image product using at least a portion of the multi-media content stored in the multi-media collection wherein the multi-media content is associated with the images or multi-media image collection in accordance with the rules.

This invention has the advantage that it provides for audio annotation when the provision of text is inconvenient, especially for mobile devices that often have limited interactive functionality. It has the additional advantage of enabling collaboration for securely making an image collection and of enabling simple and convenient interaction for participants.

BRIEF DESCRIPTION OF THE DRAWINGS

It is to be understood that the attached drawings are for purposes of illustrating the concepts of the invention and may not be to scale.

DETAILED DESCRIPTION OF THE INVENTION

In the following description, some embodiments of the present invention will be described in terms that would ordinarily be implemented as software programs. Those skilled in the art will readily recognize that the equivalent of such software can also be constructed in hardware. Because image manipulation algorithms and systems are well known, the present description will be directed in particular to algorithms and systems forming part of, or cooperating more directly with, the method in accordance with the present invention. Other aspects of such algorithms and systems, together with hardware and software for producing and otherwise processing the image signals involved therewith, not specifically shown or described herein can also be selected from such systems, algorithms, components, and elements known in the art. Given the system as described according to the invention in the following, software not specifically shown, suggested, or described herein that is useful for implementation of the invention is conventional and within the ordinary skill in such arts.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one skilled in the art. The use of singular or plural in referring to the "method" or "methods" and the like is not limiting. It should be noted that, unless otherwise explicitly noted or required by context, the word "or" is used in this disclosure in a non-exclusive sense.

The phrase, "digital image file", as used herein, refers to any digital image file, such as a digital still image or a digital video file.

Figure 1:
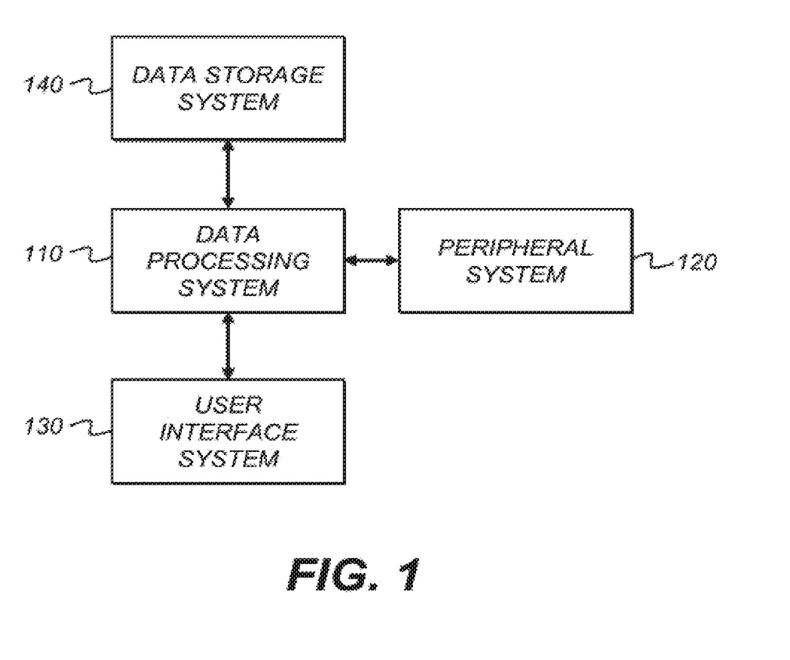
FIG. 1 is a high-level diagram showing the components of a system for providing content and annotations according to an embodiment of the present invention.

FIG. 1 is a high-level diagram showing the components of a system for annotation of an image collection according to an embodiment of the present invention. The system includes a data processing system 110, a peripheral system 120, a user interface system 130, and a data storage system 140. The peripheral system 120, the user interface system 130 and the data storage system 140 are communicatively connected to the data processing system 110.

The data processing system 110 includes one or more data processing devices that implement the processes of the various embodiments of the present invention, including the example processes described herein. The phrases "data processing device" or "data processor" are intended to include any data processing device, such as a central processing unit ("CPU"), a desktop computer, a laptop computer, a mainframe computer, a personal digital assistant, a Blackberry™, a digital camera, a digital picture frame, cellular phone, or any other device for processing data, managing data, or handling data, whether implemented with electrical, magnetic, optical, biological components, or otherwise.

The data storage system 140 includes one or more processor-accessible memories configured to store information, including the information needed to execute the processes of the various embodiments of the present invention, including the example processes described herein. The data storage system 140 can be a distributed processor-accessible memory system including multiple processor-accessible memories communicatively connected to the data processing system 110 via a plurality of computers or devices. On the other hand, the data storage system 140 need not be a distributed processor-accessible memory system and, consequently, can include one or more processor-accessible memories located within a single data processor or device.

The phrase "processor-accessible memory" is intended to include any processor-accessible data storage device, whether volatile or nonvolatile, electronic, magnetic, optical, or otherwise, including but not limited to, registers, caches, floppy disks, hard disks, Compact Discs, DVDs, flash memories, ROMs, and RAMs.

The phrase "communicatively connected" is intended to include any type of connection, whether wired or wireless, between devices, data processors, or programs in which data can be communicated. The phrase "communicatively connected" is intended to include a connection between devices or programs within a single data processor, a connection between devices or programs located in different data processors, and a connection between devices not located in data processors at all. In this regard, although the data storage system 140 is shown separately from the data processing system 110, one skilled in the art will appreciate that the data storage system 140 can be stored completely or partially within the data processing system 110. Further in this regard, although the peripheral system 120 and the user interface system 130 are shown separately from the data processing system 110, one skilled in the art will appreciate that one or both of such systems can be stored completely or partially within the data processing system 110.

The peripheral system 120 can include one or more devices configured to provide digital content records to the data processing system 110. For example, the peripheral system 120 can include digital still cameras, digital video cameras, cellular phones, or other data processors. The data processing system 110, upon receipt of digital content records from a device in the peripheral system 120, can store such digital content records in the data storage system 140.

The user interface system 130 can include a mouse, a keyboard, another computer, or any device or combination of devices from which data is input to the data processing system 110. In this regard, although the peripheral system 120 is shown separately from the user interface system 130, the peripheral system 120 may be included as part of the user interface system 130.

The user interface system 130 also can include a display device, a processor-accessible memory, or any device or combination of devices to which data is output by the data processing system 110. In this regard, if the user interface system 130 includes a processor-accessible memory, such memory can be part of the data storage system 140 even though the user interface system 130 and the data storage system 140 are shown separately in FIG. 1.

Figure 2:
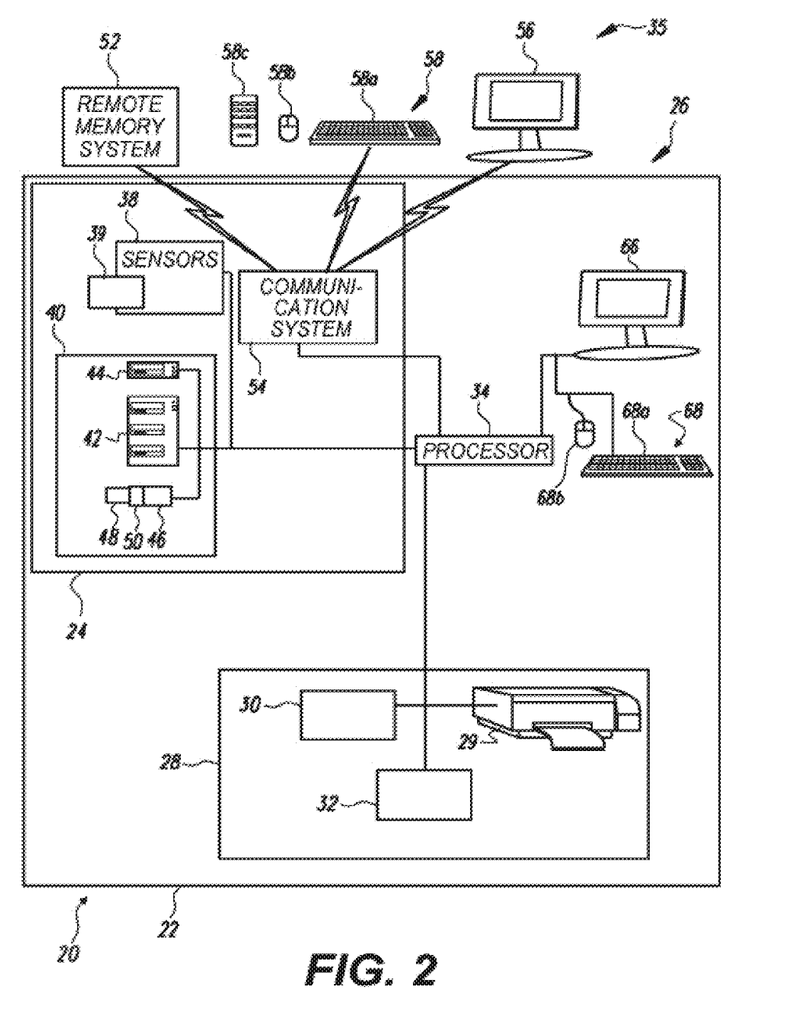
FIG. 2 is schematic of a computer system useful in the present invention.

FIG. 2 illustrates a more detailed embodiment of an electronic system 20, for example a computer, useful for enabling the present invention. In the embodiment of FIG. 2, an electronic computer system 20 includes a source of content data files 24, a user input system 26, and an output system 28 connected to a processor 34. The source of content data files 24, user-input system 26 or output system 28 and processor 34 can be positioned within a housing 22 as illustrated.

In other embodiments, circuits and systems of the source of content data files 24, user input system 26 or output system 28 can be positioned in whole or in part outside of housing 22.

The source of content data files 24 can include any form of electronic or other circuit or system that can supply digital data to processor 34 from which processor 34 can derive images for use in forming an image-enhanced item. In this regard, the content data files can include, for example and without limitation, still images, image sequences, video graphics, and computer-generated images. Source of content data files 24 can optionally capture images to create content data for use in content data files by use of capture devices located at, or connected to, electronic computer system 20 or can obtain content data files that have been prepared by or using other devices such as a remote electronic computer system 35. In the embodiment of FIG. 2, source of content data files 24 includes sensors 38, a memory 40 and a communication system 54.

Sensors 38 are optional and can include light sensors, biometric sensors and other sensors known in the art that can be used to detect conditions in the environment of electronic computer system 20 and to convert this information into a form that can be used by processor 34 of electronic computer system 20. Sensors 38 can also include one or more image sensors 39 that are adapted to capture still or video images. Sensors 38 can also include biometric or other sensors for measuring involuntary physical and mental reactions, such sensors 38 including, but not limited to, voice inflection, body movement, eye movement, pupil dilation, body temperature, and p4000 wave sensors.

Memory 40 can include conventional memory devices including solid-state, magnetic, optical or other data-storage devices. Memory 40 can be fixed within electronic computer system 20 or it can be removable. In the embodiment of FIG. 2, electronic computer system 20 is shown having a hard drive 42, a disk drive 44 for a removable disk such as an optical, magnetic or other disk memory (not shown) and a memory card slot 46 that holds a removable memory 48 such as a removable memory card and has a removable memory interface 50 for communicating with removable memory 48. Data including, but not limited to, control programs, digital images and metadata can also be stored in a remote memory system 52 such as an electronic computer system 35, a personal computer, computer network or other digital system. Remote memory system 52 can also include solid-state, magnetic, optical or other data-storage devices.

In the embodiment shown in FIG. 2, electronic computer system 20 has a communication system 54 that in this embodiment can be used to communicate with remote electronic computer systems 35 for example including an optional remote memory system 52, an optional remote display 56, or optional remote input 58 (also referred to herein as "remote input 58"). The optional remote memory system 52, optional remote display 56, and optional remote input 58 can all be part of a remote electronic computer system 35 having an input station with remote input controls, and that can communicate with communication system 54 wirelessly as illustrated or can communicate in a wired fashion. In an alternative embodiment, a local input station including either or both of a local display 66 and local input controls 68 (also referred to herein as "local user input 68") can be connected to communication system 54 using a wired or wireless connection.

Communication system 54 can comprise for example, one or more optical, radio frequency or other transducer circuits or other systems that convert image and other data into a form that can be conveyed to a remote device such as remote memory system 52 or remote display 56 using an optical signal, radio frequency signal or other form of signal. Communication system 54 can also be used to receive a digital image and other data from a host or server computer or network (not shown), a remote memory system 52 or a remote input 58. Communication system 54 provides processor 34 with information and instructions from signals received thereby. Typically, communication system 54 will be adapted to communicate with the remote memory system 52 by way of a communication network such as a conventional telecommunication or data transfer network such as the internet, a cellular, peer-to-peer or other form of mobile telecommunication network, a local communication network such as wired or wireless local area network or any other conventional wired or wireless data transfer system. In one useful embodiment, the electronic computer system 20 can provide web access services to remotely connected electronic computer systems 35 that access the electronic computer system 20 through a web browser. Alternatively, a remote electronic computer system 35 can provide web services to electronic computer system 20 depending on the configurations of the systems.

User input system 26 provides a way for a user of electronic computer system 20 to provide instructions to processor 34. This permits such a user 72 (FIG. 3) to make a designation of content data files to be used in generating an image-enhanced output product and to select an output form for the output product. User input system 26 can also be used for a variety of other purposes including, but not limited to, permitting a user 72 (FIG. 3) to arrange, organize and edit content data files to be incorporated into the image-enhanced output product, to provide information about the user 72 (FIG. 3) or audience, to provide annotation data such as voice and text data, to identify characters in the content data files, and to perform such other interactions with electronic computer system 20 as are described herein.

In this regard, user input system 26 can comprise any form of transducer or other device capable of receiving an input from a user 72 (FIG. 3) and converting this input into a form that can be used by processor 34. For example, user input system 26 can comprise a touch screen input, a touch pad input, a 4-way switch, a 6-way switch, an 8-way switch, a stylus system, a trackball system, a joystick system, a voice recognition system, a gesture recognition system a keyboard, a remote control or other such systems. In the embodiment shown in FIG. 2, user input system 26 includes an optional remote input 58 including a remote keyboard 58a, a remote mouse 58b, and a remote control 58c and a local input 68 including a local keyboard 68a and a local mouse 68b.

Remote input 58 can take a variety of forms, including, but not limited to, the remote keyboard 58a, remote mouse 58b or remote control handheld device 58c illustrated in FIG. 2. Similarly, local input 68 can take a variety of forms. In the embodiment of FIG. 2, local display 66 and local user input 68 are shown directly connected to processor 34.

Figure 3:
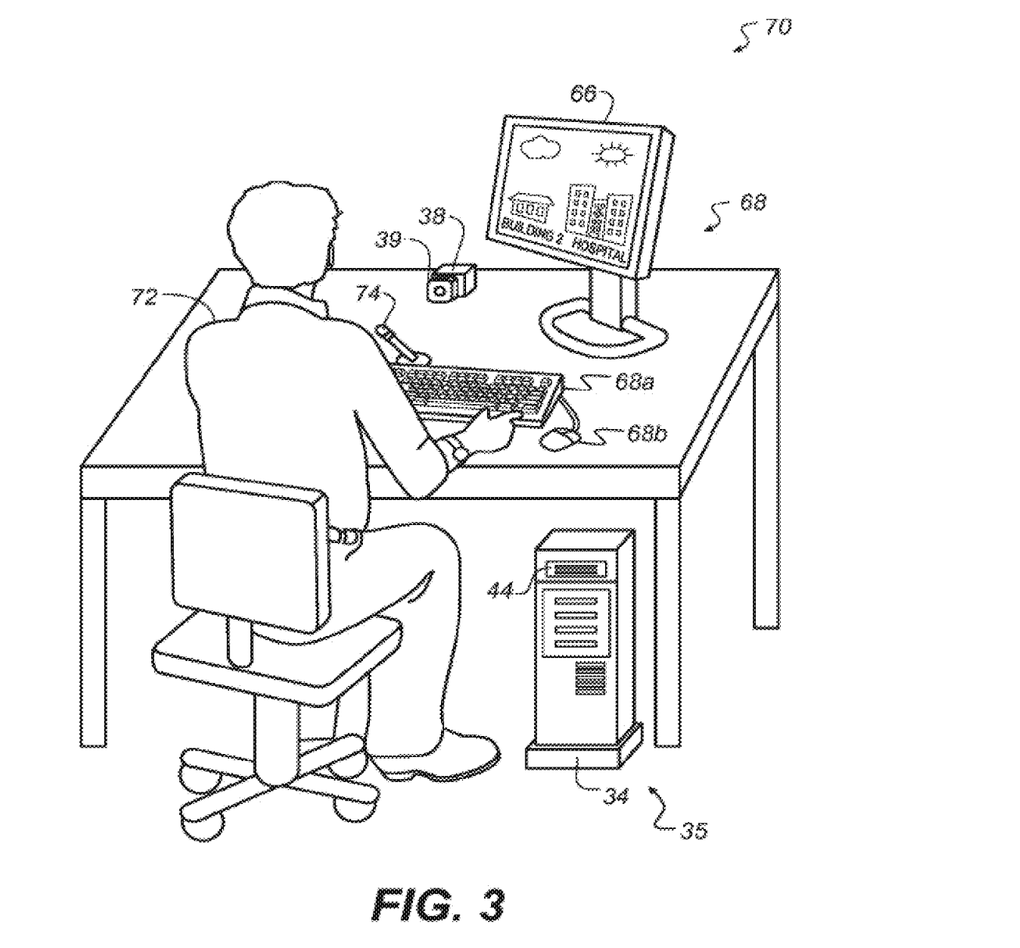
FIG. 3 is schematic of a computer system useful in the present invention.

As is illustrated in FIG. 3 local user input 68 can take the form of a home computer, an editing studio, or kiosk 70 (hereafter also referred to as an "editing area 70") that can also be a remote electronic or electronic computer system 35. In this illustration, a user 72 is seated before a console comprising local keyboard 68a and mouse 68b and a local display 66 which is capable, for example, of displaying multimedia content, for example in a graphic user interface. As is also illustrated in FIG. 3, editing area 70 can also have sensors 38 including, but not limited to, image sensors 39, audio sensors 74 and other sensors such as multispectral sensors that can monitor user 72 during a production session or provide other information such as images. Storage devices such as disk drive 44 are included in electronic computer system 35.

Output system 28 (FIG. 2) is used for rendering images, text or other graphical representations in a manner that permits image-product designs to be combined with user items and converted into an image product. In this regard, output system 28 can comprise any conventional structure or system that is known for printing or recording images, including, but not limited to, printer 29. Printer 29 can record images on a tangible surface 30 using a variety of known technologies including, but not limited to, conventional four-color offset separation printing or other contact printing, silk screening, dry electro-photography such as is used in the NexPress 2100 printer sold by Eastman Kodak Company, Rochester, N.Y., USA, thermal printing technology, drop-on-demand inkjet technology and continuous inkjet technology. For the purpose of the following discussions, printer 29 will be described as being of a type that generates color images. However, it will be appreciated that this is not required and that the claimed methods and apparatuses herein can be practiced with a printer 29 that prints monotone images such as black and white, grayscale, or sepia toned images. As will be readily understood by those skilled in the art, electronic computer systems 35, 20 with which a user 72 interacts to define a user-personalized image product can be separated from a remote computer system (e.g. 35) connected to a printer 29 or other output device 32, so that the specification of the image product is remote from its production In certain embodiments, the source of content data files 24, user input system 26 and output system 28 can share components.

Processor 34 operates electronic computer system 20 based upon signals from user input system 26, sensors 38, memory 40 and communication system 54. Processor 34 can include, but is not limited to, a programmable digital computer, a programmable microprocessor, a programmable logic processor, a series of electronic circuits, a series of electronic circuits reduced to the form of an integrated circuit, or a series of discrete components.

Figure 4:
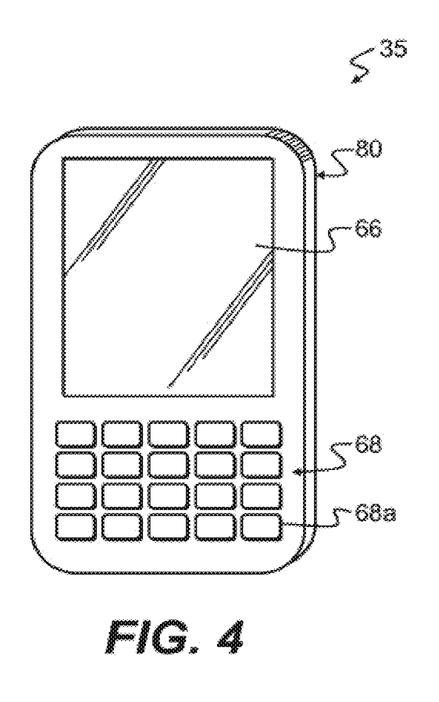
FIG. 4 is a view of a mobile communication device useful in the present invention.

In a useful embodiment of the present invention illustrated in FIG. 4, the remote electronic computer system 35 of FIG. 2 can be a mobile communication device 80, for example a cellular telephone, a smart phone, or a wirelessly connected hand-held computer such as a tablet computer. The mobile communication device 80 can include a local display 66 or a user-input system 26 (FIG. 2) incorporating a local input 68 keyboard 68a. In another embodiment, a local input 68 device can be a touch screen. The mobile communication device 80 can communicate with an electronic computer system 20 (e.g. as shown in FIG. 2) directly, for example through a wireless local area network or a point-to-point wireless connection, or indirectly through a cellular telephony network. The electronic computer system 20 can be a computer server, for example providing browser-based web pages to a remote electronic computer system 35.

Any of the server computer 20, remote electronic computer system 35, or the mobile communication device 80 can execute software programs on an internal processor 34. The software programs can interact with the user 72 through a user interface (e.g. local display 66 and local input 68) or with remote computers to accomplish the programmed task. The software programs can execute algorithms to analyze data (e.g. digital image files) or to compute useful values. A computer software program product can include one or more non-transitory, tangible, computer readable storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

Figure 5:
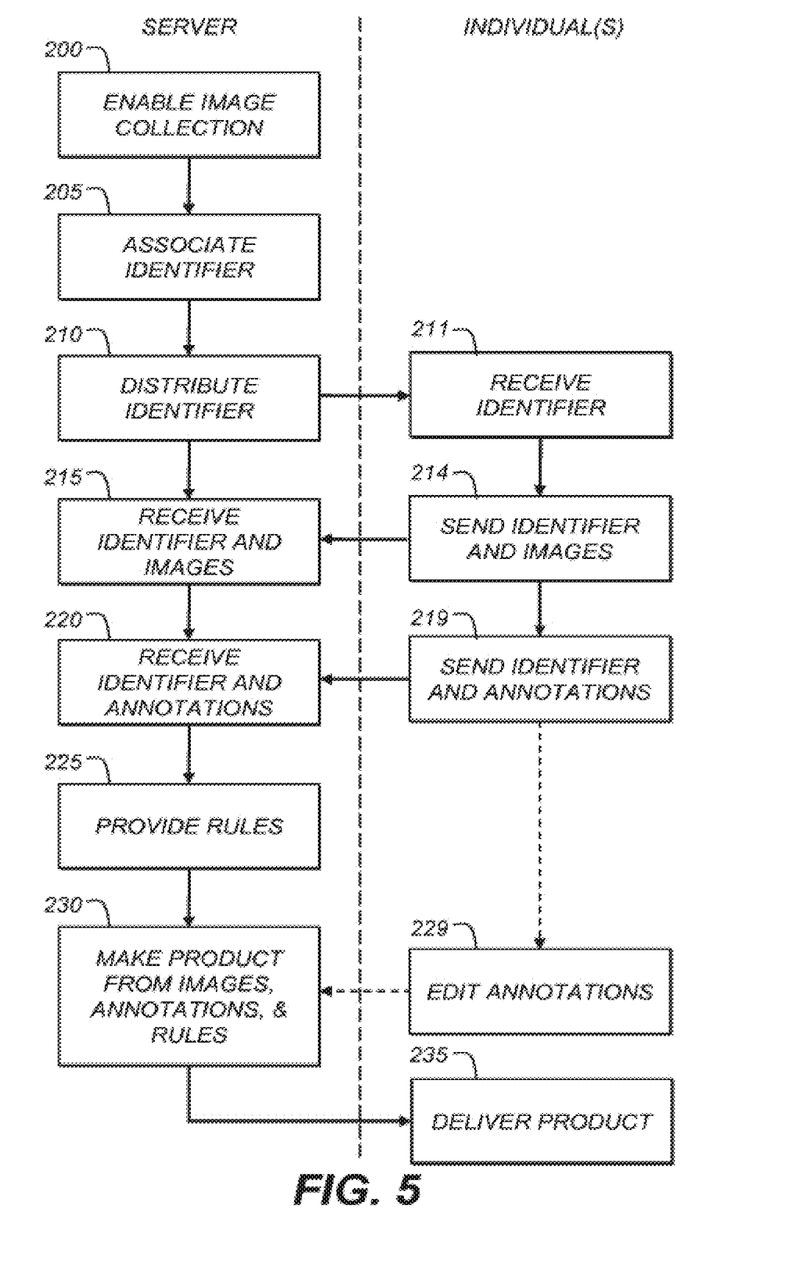
FIG. 5 is a flow diagram illustrating various embodiments of the present invention.

The present invention will now be described with reference to FIG. 5. According to an embodiment of the present invention, a method for annotation of an image collection includes using a processor (e.g. electronic computer system 20) to provide a storage location for an image collection in a digital storage system (e.g. disk drive 44 or remote memory system 52) in step 200. This can be accomplished by producing a storage location (e.g. a file folder) in a computer-controlled memory system 52 which can be remotely accessible, for example through the internet. The digital storage system (e.g. disk drive 44 or remote memory system 52) can be controlled or owned by a third party other than the one that enables the image collection. For example, a user 72 can specify a folder for storing digital images in a digital storage system on a computer or specify an album on a photo-sharing website on a remote memory system 52. The user 72 can also store digital images within the collection, if desired, by accessing the computer controlling the storage location and copying images into the image collection or uploading images to a computer server that controls the storage location. As used herein, an image collection is a set of images having a common logical storage location, although the data for the images in the collection can be distributed over multiple storage devices such as disk drives, as is well known in the computer storage industry. The term image collection is used similarly to the term storage location, and generally refers to the logical storage location of the images in the collection. The image collection can have no images stored in the storage location when it is first specified, for example as is the case when a file folder is first defined in an operating system.

In step 205, an identifier is associated with the storage location of the image collection. The identifier can also be associated with the image collection. In various embodiments, the identifier can be selected by the user 72, for example as an album name, or can be provided by the owner of the storage system, if different, for example as an encoded text string. Generally, it is preferred that the identifier be unique, so that if the user 72 selects the identifier, additional characteristics or codes can be added to the identifier. The identifier can be a name, an email address, or a telephone number and can include additional values or codes. The identifier serves to enable storing data, such as images, in the image collection at the storage location or to access stored data in the image collection at the storage location. The identifier can be an address in a computer system, network, or storage system or it can refer to such an address. If the identifier refers to an address or location, a table associating identifiers with specific storage locations can be provided, for example by a table that associates identifiers with addresses. Such tables and data associations are well known in the programming arts.

The identifier is then provided for distribution to a plurality of individuals in step 210. This distribution can be done in a variety of ways according to various embodiments. For example, the identifier can be emailed to the individuals, provided verbally, or printed and distributed as a hard copy notice. The identifier can be provided directly or indirectly by the user 72, through the electronic computer system 20, or under the control of electronic computer system 20 directly to the plurality of individuals or for distribution by the user 72 or others. Individuals that receive the identifier can also further distribute the identifier to additional individuals that can have an interest in the image collection. One or more of the plurality of individuals receives the identifier in step 211.

In step 214, one or more of the individuals sends the identifier with one or more images to, for example, a computer server on the internet (e.g. electronic computer system 20). In step 215, information associated with the identifier or the identifier and one or more images are received from a first individual and the received images, for example digital images, are associated with the image collection and stored on the storage device (e.g. hard drive 42) at the storage location. The first individual can be a person to whom the identifier was distributed. The identifier is sent by the first individual to the electronic computer system 20 to identify the image collection with which received images are to be associated. Alternatively, the arrangement by which the images are sent or addresses to which they are sent constitute the identifier or information associated with the identifier.

The identifier and images can be transmitted and received in a variety of ways, for example by email, by surface mail (for example with images stored on a storage medium such as a compact disk), or through a telephonic connection (e.g. a data transmission through a landline telephone, cell phone or smart phone). If an electronic transmission is used, the address of the receiver can be the identifier, or a portion of the identifier, for example an internet URL or a telephone number. In this case the access address is not necessarily received but is rather the mechanism by which an electronic contact is made. The electronic computer system 20 can then associate the address with a specific storage location and image collection. The association constitutes additional information associated with the identifier. For example, an email address or telephone number can be an identifier associated with an image collection and storage location. When information is received by the electronic computer system 20 at that electronic address, E-mail address, or telephone number, the electronic computer system 20 can employ a look up table or other electronic reference stored in a memory or register to discover the image collection and storage location associated with the electronic address, E-mail address, or telephone number.

In various non-limiting embodiments, the identifier can be an email address, a URL, a URI, a text string, a graphic code such as a bar code or QR code, or a telephone number. Additional codes can be employed with the identifier or as part of the identifier to further identify the transmitted and received images and their associated image collection. E-mail addresses, URLs, or telephone numbers are explicitly included as various embodiments of the present invention, together with any other identifying codes. For example, a user might call a specific telephone number or send E-mail to a specific address and then provide further information (e.g. a number, text string, or name) to associate transmitted information with the desired image collection and storage location. Electronic equipment for receiving codes entered from a telephone keypad or keyboard for telephones, computers, or web sites are well known, for example using voice mail systems, electronic messaging, and web browsers.

In step 219, one or more of the individuals sends the identifier with one or more annotations to, for example, a computer server on the internet. In step 220, information associated with the identifier or the identifier and one or more annotations are received from the same individual or a second individual different from the first individual and the received annotations, for example audio or text annotations, are associated with the digital images in the image collection and stored on a storage device (e.g. hard drive 42) Annotations can include, for example, messages, observations, or comments relevant to a particular image or to an entire image collection and can have a variety of formats or forms, or constituted in various media. The identifier, or the information associated with the identifier can be similar to that of step 215 discussed above and the communication method can be the same, or different. In addition to the first and second individuals, other additional individuals who have received the identifier can provide images, multi-media content, or audio or textual annotations that are then associated with the image collection and used in a multi-media product.

The annotations can be associated with specific images in the image collection either through the identifier alone, through codes included with the identifier, or through additional information received after the identifier is sent, for example by asking a user to enter additional information identifying the images to be associated with the annotations, for example by using a voice recognition system to select images or through text entries (e.g. a number known to be associated with a specific image, images, or the image collection).

In step 225, rules are provided that associate annotations with specific images or with the image collection in general. In various embodiments, multiple annotations can be associated with a single image, or a single annotation can be associated with multiple images. One or more annotations can be associated with the image collection only or with all images in the image collection. Furthermore, rules specifying the presentation of annotations (either text or audio) with respect to any associated images can be used to specify the manner in which the annotations and images are presented in the multi-media product Annotations from different sources or contributors can be widely distributed in the collection or product, limited, grouped, or separated. For example, it can be desired to limit the number or length of annotations from a single contributor or the content of an annotation to ensure that the content is suitable to the collection (e.g. limiting inappropriate language or image content).

Rules can be provided that customize the annotations, images, image collection, or multi-media product for different recipients of the multi-media product. The rules can also specify the nature of the multi-media product in response to the types of annotations and digital images.

For example, in a hard-copy multi-media product, rules can specify textual annotations printed in different locations in association with an image or in locations not associated with any images but with the image collection. Audio annotations can be played when evoked, for example by viewing an image or image sequence, or by activating a switch located in different locations in association with an image or with multiple images, or in a location not associated with a specific image or group of images. Rules governing multiple audio annotations associated with an image or with the image collection can specify that they are all played sequentially when activated with a single switch activation, or that a separate activation can be required to play each audio annotation, or that a random selection of one or more audio annotations can be made in response to a switch activation.

A digital memory can be provided for storing the audio annotation, rules for associating images and collections, and a control for activating circuits to play the audio annotation from the digital memory in accordance with rules.

In a digital multi-media product, rules specify that textual annotations can be displayed in different locations in association with an image or in locations not associated with any images but with the image collection. Audio annotations can be played when evoked by selecting a control in all of the arrangements described above, or can be played in association with text annotations, or the text annotations can be aurally played using a text-to-voice convertor. One skilled in the software arts can store rules and implement the rules and functions with a processor and known hardware peripherals.

A local display 66 can provide a user interface in a computer system for presenting one or more of the images in the image collection to a viewer or for presenting multi-media content or annotations.

Default rules can be employed to reduce the number of choices that a user makes. The default rules can be supplied by a third party, one of the individuals, or by a vendor of the multi-media product.

Once the images, annotations, and rules are received and properly associated with the image collection, a multi-media product incorporating one or more of the digital images and annotations can be specified. In an optional step 229, indicated by the dashed arrows in FIG. 5, the annotations, associations, rules and images can be edited as desired by a recipient of a specified multi-media product or by a person organizing or contributing to the specified multi-media product. The editing can be done by one or more person, iteratively, before the specification of the product (e.g. by editing images or annotations), or after, to customize the multi-media product to different individuals or to the specific desires of one individual.

The annotations can include both text and audio information. A typical person can readily skim through printed text to read with attention only those portions of the text which are of greater interest to the reader while it is difficult to skim through an audio presentation. Hence, in an example, fewer audio annotations are associated with a single control, so that a user need not listen to as many annotations before moving to a new element in the multi-media product. Furthermore, rules can be specific to the media, for example the font or type size of text is not a relevant attribute to an audio annotation, as volume in an audio annotation is not relevant to a text annotation. Therefore, according to an embodiment, different rules can be provided for different types of annotation, for example text and audio.

Once the multi-media product is acceptable and completely specified, it can be made in accordance with the rules (step 230). The multi-media product can be a hard-copy product (e.g. a photo-book or photo-collage with textual annotation or audio playback) or a digital product (for example a digital image slideshow, digital photo album, or digital collage with audio that is played back with a software-controlled media player. The multi-media image product can be a digital multi-media image product stored in a digital storage medium.

The multi-media image product can be a hard-copy multi-media image product with an associated link to a playback device. For example, non-electronic image products such as mugs can include printed codes that include information that, when scanned with an electronic scanner (e.g. a smart phone), enable audio playback either by encoding an audio file or by encoding a reference to an audio file, such as a URL. An example of a useful code is a one-dimensional or two-dimensional bar code such as a QR code. Such playback or remote access to electronically stored information from printed codes is known in the electronic and computer arts.

In either the hard-copy case or digital (soft-copy) case, the multi-media product can be delivered to customers (step 235), for example either by surface mail (for hard-copy products) or by E-mail or made accessible from an on-line digital storage repository (for digital products).

In one embodiment of the present invention, the annotations are audio annotations. An audio annotation can be an electronic audio file, a voice recording provided by an individual, or a selection of a pre-recorded audio message. An audio annotation can be received as an E-mail, an audio file recorded on a physical medium (e.g. an optical disc), by recording a telephonic message into an audio file, through a web browser executing on a computer, or from a software application executing on a processor. The audio annotation can be received from a software application installed on a client computer that interacts with a remote server connected to the client computer through a computer network (e.g. as shown in FIGS. 2 and 3). Alternatively, the audio annotation can be received from a web browser executing on a client computer that presents information provided from a remote server connected to the client computer through a computer network.

For example, the identifier can be a telephone number and a customer can call the telephone number and make an audio recording that is recorded by an audio recording device accessed through the telephone, for example, by using technologies such as are used for voice mail, to provide an annotation. Previously made audio recordings can also be reviewed or edited. In an alternative example, the identifier can be an email address and a customer can record a digital audio file (for example using digital audio tools such as USB microphones connected to computers) and email the audio file to the email address.

In another embodiment of the present invention, an identifier, images, or annotations are received from a mobile cellular telephone. The annotations can take a variety of forms, for example the annotations can be either textual or audio. Contemporary cellular telephones (e.g. mobile communication device 80) can incorporate user interfaces that include text input (for example a keypad) or audio input (using the microphone for inputting sound to make an electronic audio signal). The user interface can be used to make an image annotation that is then transmitted to an electronic computer system 20 through the cellular telephone network. Other communications can also be used, for example point-to-point electromagnetic communication (e.g. Bluetooth) or local area networks, either wired or wireless.

Therefore, an alternative method of the present invention includes using a processor to provide a storage location for a multi-media image collection on a digital storage system and associating an identifier with the storage location and image collection. The identifier is adapted to be communicated from or with a mobile communication device, for example through a cellular telephone making a telephone call. The identifier is provided for distribution to a plurality of individuals. Two or more of the individuals, or others who have been provided with the identifier, transmit a plurality of multi-media content employing the identifier to the processor from one or more mobile communication devices operated by the respective individuals, for example mobile communication devices. The multi-media content includes one or more images, audio annotations, or text annotations captured by the mobile communication devices, for example cellular telephones. The multi-media can include the identifier or the identifier can be an address (e.g. telephone number, E-mail address, or network location address) with or without additional identifying information. The received multi-media content is stored in the storage location and associated with the multi-media collection. Rules are provided for associating the multi-media content with the images or the multi-media image collection. The resulting specification of the multi-media product can be edited as desired. A multi-media image product using at least a portion of the multi-media content stored in the multi-media collection is made, wherein the multi-media content is associated with the images or multi-media image collection in accordance with the rules.

Referring to FIGS. 2 and 3, for example, a system for annotation of an image collection can include a digital storage system for storing an image collection in a digital storage system, the image collection having an associated identifier. The image collection can be a multi-media image collection, for example the images can be still, video, include audio, textual information, or other content. The system can include communication ways for distributing the identifier to a plurality of individuals, for example by mail, E-mail, printed information, or verbally and ways for receiving information associated with the identifier or the identifier together with one or more images from a first individual. Alternatively, the information can be received from a plurality of individuals, for example using mobile communication devices 80, such as cellular telephones. The communication ways includes associating the received image(s) with the storage location, for example by using a processor to use the identifier to locate the storage location and a computer-controlled file system to associate the received images with the multi-media image collection, for example using a logical file folder structure. The system also includes communication ways for receiving information associated with the identifier or the identifier together with multi-media content such as one or more text or audio annotations from a plurality of individuals or a second individual different from the first individual and associating the received multi-media content, text annotation(s), or audio annotation(s) with the storage location, for example by using a processor to store the multi-media content, text annotation(s), or audio annotation(s) in a logical storage structure such as a file folder. The system can also provide rules for associating multi-media content, text annotations, or audio annotations with the images or the image collection. The rules can be, for example, provided by a multi-media product vendor or specified by a user using an interactive software application or through a web-based application on a remote computer or mobile communication device. The system can include a digital memory for storing audio or text annotations, a processor for storing and applying rules for associating images, annotations, and collections, and a control for activating circuits to play the annotations from the digital memory in accordance with rules. The system can also include ways for making a multi-media image product that includes one or more images from the image collection together with multi-media content, one or more text annotations, or one or more audio annotations wherein the multi-media content, one or more text annotations, or one or more audio annotations are associated with the images or image collection in accordance with the rules. Such ways can include controlling manufacturing equipment or communicating a multi-media product specification to a separate system, for example a manufacturing system owned by a third party. The system can also provide ways for editing the specification of the multi-media product, for example by modifying the rules, annotations, associations, or images in the image collection.

In yet another embodiment of the present invention, a computer program product for audio annotation of an image collection uses the methods described above and can execute on a computer system such as that described above.

In various embodiments of the present invention, the identifier is a universal resource locater (URL), a universal resource identifier (URI), a telephone number, an identification number, a collection name, an electronic code, an optically recognizable code, an instant message address, or an E-mail address. An optically recognizable code can be a one-dimensional bar code or a two-dimensional bar code, such as a QR code. Such codes contain information and are known in the prior art. For example, a user can scan an optically recognizable code and employ a software application to direct images or multi-media content to a location specified in the code. The first individual can be an individual who established the image collection. Alternatively, a third individual different from the first and second individuals can be an individual who establishes the image collection. Various different individuals can also specify the formation of the multi-media image product, for example any of the individuals that contribute images or annotations to the image collection or establish the image collection, or others. An individual who specifies the image collection can also initialize the image collection by providing an initial set of images that are stored in the storage location in association with the image collection, for example in a file folder or album collection. The image collection can thus contain images from a variety of individuals and the multi-media image product can likewise contain images from different individuals, such as the individual that initialized the image collection and an individual that later added images or other multi-media content or annotations in association with the image collection.

The present invention is useful for facilitating the production of multi-media image products based on collaboration at social occasions. For example, weddings are popular events for photography. Another example is funerals at which family members gather to commemorate a deceased relative. In one non-limiting embodiment of the present invention, a photographer provides a storage location for an image collection in an on-line album or repository on an internet-accessible computer server. The storage location can be specific to a particular social occasion, for example a wedding and can have an identifier, chosen by the photographer or by the computer server associated with the storage location, for example an internet address with a suffix including an occasion name. In another embodiment, the identifier is a telephone number with a numeric or alphabetic code relevant to the occasion name. The photographer can make digital photographs of, or relevant to, the social occasion and store the photographs in the storage location and can also distribute the identifier to guests at the social occasion. The photographs can include recent or recent historical photographs.

The guests can use the identifier to access the stored photographs, for example viewing them in a browser on a computer, for example a desktop computer or a mobile communication device with a display and having internet access for viewing remotely stored content, such as a smart phone. Guests can then record comments relevant to the social occasion or the stored photographs and upload them to the storage location to associate the comments with the image collection. Guests can also upload digital images to the repository, for example images taken at the social occasion or relevant images of historical interest possessed by one or more of the guests. These uploaded images can also be viewed by other guests and further comments or annotations provided. In yet another embodiment, guests can upload pre-recorded audio clips that express a desired sentiment, for example selected from a library of such audio clips.

At the conclusion of the social occasion, or after some designated period after, a multi-media image product that includes one or more images from the image collection together with one or more of the annotations is made and can be provided to attendees or guests of honor at the social occasion.

The multi-media product can be made in association with rules for how the product is to operate. Such rules can be decided by a vendor of the product or by a professional photographer that facilitates the construction of the multi-media image collection, or by a professional photographer in consultation with an organizer of the social occasion or guest at the social occasion.

In one embodiment of the present invention, the photographer is a wedding photographer hired by a wedding organizer and guests at the wedding provide annotations and images to an image collection initiated by the wedding photographer. Guests can make images and provide annotations at a reception or thereafter, and upload them when made or later. The photographer can then organize, specify, and construct (or have a third party construct) a multi-media product commemorating the occasion according to the rules. The photographer can review the specified multi-media product and edit it as desired, or consult with those that desire to receive the organized multi-media product and permit them to edit the specification or edit the specification in accordance with their desires.

In another embodiment of the present invention, a funeral organizer hired by a family member, a friend, or a family member organizes a social occasion to mourn or celebrate the life of deceased friend or family member. The organizer instantiates the image collection and guests at the occasion provide images or annotations to the image collection either at the time, before, or after. At the conclusion of the event, or sometime thereafter, the organizer can specify and construct (or have a third party construct) a multi-media product commemorating the occasion. Additionally, the specified product can be edited as described above.

In yet another embodiment of the present invention, a friend or family member organizes the production of a memento such as a multi-media expression of concern or support for an injured or ill friend, colleague, or relative. The organizer instantiates the image collection and other members of the social community provide images or annotations to the image collection. The images and annotations are used to produce the multi-media memento which is then presented to the injured or ill friend, colleague, or relative.

Other social occasions in addition to these described above can provide opportunities for the collaborative specification and subsequent construction and distribution of an annotated multi-media product and are included in the present invention.

The invention has been described in detail with particular reference to certain preferred embodiments thereof, but it will be understood that variations and modifications can be effected within the spirit and scope of the invention.

PARTS LIST 20 electronic computer system, server computer
22 housing
24 source of content data files
26 user input system
28 output system
29 printer
30 tangible surface
32 output device
34 processor
35 electronic computer system
38 sensors
39 image sensors
40 memory
42 hard drive
44 disk drive
46 memory card slot
48 removable memory
50 memory interface
52 remote memory system
54 communication system
56 remote display
58 remote input
58a remote keyboard
58b remote mouse
58c remote control
66 local display
68 local input
68a local keyboard
68b local mouse
70 home computer, editing studio, or kiosk (editing area)
72 user
74 audio sensors
80 mobile communication device
110 data processing system
120 peripheral system
130 user interface system
140 data storage system
200 enable image collection step
205 associate identifier step
210 distribute identifier step
211 receive identifier step
214 send identifier and images step
215 receive identifier and images step
219 send identifier and annotations step
220 receive identifier and annotations step
225 provide rules step
229 optional edit step
230 make product step
235 deliver product step

The invention claimed is:

1. A method of making a multi-media image product using a multi-media image system comprising a data processing system and a data storage system, the method comprising:
storing an image collection on the data storage system, the image collection comprising a plurality of digital images;
storing preset vendor rules on the data storage system, the vendor rules specifying a digital image layout and an annotation presentation layout for a multi-media image product, wherein the annotation presentation layout specifies a first presentation format for text annotations when the multi-media image product is a hard-copy product and specifies a second presentation format for audio annotations when the multi-media image product is a digital product;
generating an identifier associated with the image collection, wherein the identifier comprises a computer network address for the image collection;
distributing the identifier electronically via a computer network to a user's remote device;
receiving the identifier from the user via the computer network;
granting the user remote access to the image collection via the computer network;
receiving, from the user via the computer network, a new digital image, an annotation corresponding to the new digital image, an annotation assignment instruction, and the identifier wherein the annotation assignment instruction instructs the annotation to be associated with the new digital image through the identifier or through a code included with the identifier, and wherein the annotation is a text annotation or an audio annotation;

storing the new digital image and the annotation corresponding to the new digital image within the image collection using the received identifier;

limiting a number, length, and content of annotations made by identified users based on the preset vendor rules; and making a multi-media image product according to the preset vendor rules, wherein the multi-media image product includes at least one digital image from the image collection, the new digital image, and the annotation received from the user in association with the new digital image pursuant to the annotation assignment instruction.

2. The method of claim 1, further comprising editing the annotation received from the user.

3. The method of claim 1, wherein the annotation is an audio annotation and the multi-media image product is a digital product.

4. The method of claim 1, further comprising:
generating a code associated with the image collection;
distributing the code with the identifier to the user's remote device via the computer network;
receiving the code with the identifier from the user via the computer network; and
granting the user remote access to the image collection via the computer network upon receipt of both the code and the identifier.

5. The method of claim 1, further comprising:
receiving, from the user via the computer network, an image;
storing the image from the user on the data storage system; and
incorporating the image from the user into the multi-media image product.

6. The method of claim 5, wherein the annotation received from the user is associated with the image received from the user.

7. The method of claim 1, wherein the annotation presentation layout specifies a font size for the text annotations when the multi-media image product is a hard-copy product.

8. The method of claim 1, wherein the annotation presentation layout specifies an audio volume for the audio annotations when the multi-media image product is a digital product.

9. The method of claim 1 further comprising:
receiving a plurality of annotations from a plurality of users via the computer network; and
storing the plurality of annotations on the data storage system, wherein each one of the plurality of annotations is stored in association with a specific image in the image collection.

10. The method of claim 9, wherein making the multi-media image product comprises incorporating one of the plurality of annotations stored on the data storage system.

11. The method of claim 1, further comprising associating the annotation to the specific digital image in accordance with the annotation assignment instruction, wherein the multi-media image product further includes the specific image in association with the annotation received from the user.

12. The method of claim 1, further comprising:
receiving, from the user via the computer network, a request for a hard-copy product,
wherein the annotation received from the user is a text annotation, and
wherein making the multi-media image product comprises making the requested hard-copy product in accordance with the first presentation format.

13. The method of claim 1, wherein the identifier is selected from the group consisting of: an email address, a URL, a URI, a text string, a bar code, a QR code, and a telephone number.

* * * * *